United States Patent [19]
De Bree et al.

[11] Patent Number: 5,959,217
[45] Date of Patent: Sep. 28, 1999

[54] FLUID FLOW MEASURING DEVICE AS A MICROPHONE AND SYSTEM COMPRISING SUCH A MICROPHONE

[75] Inventors: Hans Elias De Bree, Diezestraat 29, Enschede, NL-7426 SK; Theodorus Simon Joseph Lammerink, Enschede; Michael Curt Elwenspoek, Hengelo; Johannes Hermanus Josephus Fluitman, Enschede, all of Netherlands

[73] Assignee: Hans Elias De Bree, Enschede, Netherlands

[21] Appl. No.: 08/765,597

[22] PCT Filed: Jun. 22, 1995

[86] PCT No.: PCT/NL95/00220

§ 371 Date: Mar. 7, 1997

§ 102(e) Date: Mar. 7, 1997

[87] PCT Pub. No.: WO96/00488

PCT Pub. Date: Jan. 4, 1996

[30] Foreign Application Priority Data

Jun. 24, 1994 [NL] Netherlands .............................. 9401051

[51] Int. Cl.[6] ........................................................ G01F 1/66
[52] U.S. Cl. ............................................................ 73/861.25
[58] Field of Search ............................. 73/204.25, 204.26, 73/204.27, 861.25

[56] References Cited

U.S. PATENT DOCUMENTS

| | | |
|---|---|---|
| 4,914,742 | 4/1990 | Higashi et al. ...................... 73/204.16 |
| 4,932,250 | 6/1990 | Assaf et al. . |
| 4,947,688 | 8/1990 | Yagawara et al. ................... 73/204.26 |
| 4,966,037 | 10/1990 | Sumner et al. ...................... 73/204.26 |
| 5,243,858 | 9/1993 | Erskine et al. ....................... 73/204.26 |
| 5,263,380 | 11/1993 | Sultan et al. ......................... 73/204.26 |
| 5,321,983 | 6/1994 | Nagata ................................. 73/204.26 |
| 5,392,647 | 2/1995 | Manaka ............................... 73/204.26 |
| 5,406,841 | 4/1995 | Kimura ................................ 73/204.26 |

FOREIGN PATENT DOCUMENTS

| | | |
|---|---|---|
| 0 268 004 | 5/1988 | European Pat. Off. . |
| 0 285 451 | 10/1988 | European Pat. Off. . |
| 36 11 614 | 10/1987 | Germany . |
| 1-236800 | 9/1989 | Japan . |
| 2 226 139 | 6/1990 | United Kingdom . |

OTHER PUBLICATIONS

R. Fehr, "Infrasonic Thermistor Microphone", Journal of the Audio Engineering Society, Apr. 1970, vol. 18, No. 2, pp. 128–132.

T. Lammerink et al., "Micro–liquid flow sensor", Sensors and Actuators, 1993, vol. 37–38, pp. 45–50.

*Primary Examiner*—George Dombroske
*Assistant Examiner*—Jewel Thompson
*Attorney, Agent, or Firm*—Young & Thompson

[57] ABSTRACT

A fluid flow measuring device as a microphone for detecting acoustic waves includes at least one heating element (H), at least a first temperature sensor (S1) arranged at a first predetermined spacing (r1) from the heating element (H), for generation of a first electrical signal which corresponds to the temperature (T1) of the first temperature sensor (S1), wherein the predetermined first spacing (r1) is less than 300 $\mu$m.

20 Claims, 5 Drawing Sheets fig-1a fig-1b fig-1c fig-2a fig-2b fig-3 fig-4a fig-4b fig-4c fig-4d

FLUID FLOW MEASURING DEVICE AS A MICROPHONE AND SYSTEM COMPRISING SUCH A MICROPHONE

BACKGROUND OF THE INVENTION

The present invention relates to the use of a fluid flow measuring device as a microphone.

Conventional microphones make use of the fact that the pressure waves associated with an acoustic signal give rise to mechanical vibrations in a membrane or the like, which vibrations are converted with the aid of suitable conversion means into an electrical varying signal, the frequencies arising in the electrical varying signal corresponding to those of the acoustic signal.

The invention is based on the fact that a pressure wave and a mass flow wave are always associated with an acoustic wave, the flow wave, however, having a phase shift relative to the pressure wave. However, the flow waves which are associated with an acoustic signal comprise the same frequency pattern as the pressure waves and are therefore also able to serve as the basis for sound measurement.

The use of a fluid flow measuring device as a microphone is known from R. O. Fehr, "Infrasonic thermistor microphone", Journal. of the Audio Engineering Society, April 1970, Vol. 18, Nr. 2, pages 128–132. This publication discloses the use of hot-wire anemometers for the measurement of turbulence. In such devices, a very fine wire is electrically heated and is cooled depending on the turbulence of the air. The temperature changes of the wire are registered as resistance variations of the wire. The resistance variations can be detected by suitable electronic measuring circuits, thus providing an electrical signal which is proportional to the volume flow. However, hot-wire microphones are insensitive to the direction of the volume flow. Moreover, hot-wire microphones double the frequencies of the volume flow variations. In the publication of R. O. Fehr, the application of two thermistors is disclosed to solve these problems of the hot-wire microphones. When there is a volume flow over one of the two thermistors, the windward thermistor will be cooled, whereas the other thermistor will receive heat transferred by the wind from the first thermistor. Again, the temperature variations of the two thermistors are translated into varying electrical signals by connecting the two thermistors in opposite arms of an electrical bridge circuit. The microphone described in this publication is reported to operate only in a frequency range from 0.1 to 20 Hz. The diameter of the thermistors used is reported to be about 330 $\mu$m (13 mill). Since the publication of this article by R. O. Fehr about 25 years ago, no research has been carried out for developing a microphone based on fluid flow measurements for detecting acoustic waves in the audible range.

U.S. Pat. No. 4,932,250 suggests the use of a fluid flow measuring device as a microphone for the detection of ultrasonic waves. No arrangement is suggested to detect acoustic waves within the audible range.

From several documents a micro fluid flow measuring device is known which comprises at least one heating element and at least two temperature sensors arranged in opposite positions to the heating element; see e.g. the German patent application 36 11 614, the European patent application 0,268,004, British patent application 2,226,139, and T. S. J. Lammerink, et al., "Micro-liquid flow sensor", Sensors and Actuators A, 37–38 (1993), pages 45–50. In none of these documents reference is made to a possible use of the fluid flow sensor disclosed as a microphone.

The object of the invention is to provide a microphone which is able to detect acoustic waves in the audible frequency range based on fluid flow measurements.

In order to achieve this objective, use is preferably made of techniques and means for the measurement of fluid flow which are known per se. A typical example of a fluid flow sensor which can advantageously be used in the microphone according to the invention is described in: T. S. J. Lammerink, et al., "Micro-liquid flow sensor", Sensors and Actuators A, 37–38 (1993), 45–50, referred to above.

The invention provides the use of a fluid flow measuring device as a microphone for detecting acoustic waves, said fluid flow measuring device comprising at least one heating element, at least a first temperature sensor arranged at a first predetermined spacing from the heating element, for generation of a first electrical signal which corresponds to the temperature of the first temperature sensor wherein the predetermined first spacing is less than 300 $\mu$m.

By using techniques now known from micro-electronics it is possible to construct such a fluid flow measuring device with such micro-dimensions. Surprisingly, the signal to noise ratio of such a microphone is good up to 10 kHz, or more. A good signal to noise ratio, up to 10 kHz, was observed in a practical embodiment of the invention where one heating element was accompanied by two temperature sensors located on opposite sides of the heating element at a spacing of 40 $\mu$m. Good signal to noise ratios up to such high frequencies can therefore be achieved with the microphone according to the invention when the spacing between the heating element and the temperature sensors applied is less than 50 $\mu$m.

A further advantage of this microphone is that it has an extremely low cut-off frequency: conventional microphones are no longer able to detect very low frequencies of an acoustic signal because of the inherent rigidity of the membrane or the like measuring the pressure wave. In a microphone according to the invention, on the other hand, very low frequencies of an acoustic signal are converted into very low frequencies of a thermal signal, which is converted without attenuation into a low-frequency electrical signal.

The invention also relates to a system comprising a microphone comprising a fluid flow measuring device for detecting acoustic waves, said fluid flow measuring device comprising at least one heating element, at least a first temperature sensor arranged at a first predetermined spacing from the heating element, for generation of a first electrical signal which corresponds to the temperature of the first temperature sensor wherein the predetermined first spacing is less than 300 $\mu$m, the microphone also comprising an electronic measuring circuit for measuring said first electrical signal and providing an electrical output signal, the system further comprising an amplifier for amplifying said output signal and providing an amplified output signal, and a loudspeaker connected to said amplifier.

A microphone based on the measurement of fluid flow waves may be advantageously used in combination with a microphone based on pressure wave measurements. With an arrangement of this type, both the flow waves and the pressure waves of an acoustic signal can be measured, as a result of which the possibility exists of determining not only the magnitude but also the absolute propagation direction of the propagating acoustic signal.

Advantageous embodiments of the use of a fluid flow measuring device as a microphone, and of the system comprising a microphone based on fluid flow measurements are also defined.

BRIEF DESCRIPTION OF THE DRAWINGS

The invention will be explained below with reference to the appended drawings, in which preferred embodiments of the microphone according to the invention are shown and which are intended to illustrate the invention and not as a limitation of the latter.

In the drawings:

FIG. 2a shows a diagrammatic top view of the microphone according to FIG. 1a;

FIG. 2b shows an electric bridge circuit for generation of an electrical signal which is representative for an acoustic wave measured by the microphone of FIG. 1a;

DESCRIPTION OF THE PREFERRED EMBODIMENT

Figure 1A:
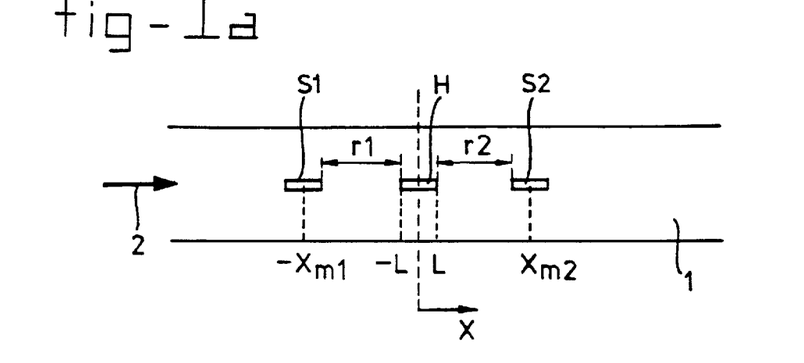
FIG. 1a shows a side view of a microphone based on fluid flow measurement.

FIG. 1a shows an example of a set-up for measurement of several parameters of a fluid flow 2 through a channel 1. Said set-up is known per se for the measurement of parameters such as the physical parameters of a gas, e.g., the gas density, the magnitude of the flow in the case of static flows, etc. As a fluid flow sensor, the set-up according to FIG. 1a is based on well-known thermal anemometer principles. The set-up comprises a heating element H and two sensors S1, S2. Both the heating element H and the two sensors S1, S2 are located in a channel 1, through which the fluid flow 2 is fed. The width of the heating element H is 2L. The sensor S1 is located at a distance $x_{m1}$ away from the heating element H and the sensor S2 is located opposite the sensor S1 at a distance $x_{m2}$ away from the heating element H. The spacing between heating element H en sensor S1 is indicated by reference sign r1, and between heating element H and sensor S2 by r2. In order to simplify the measurements, the two sensors S1, S2 can each be located the same distance away from the center of the heating element H. However, this is not strictly necessary. The sensors S1, S2 and the heating element H also do not have to be located in one line, as in FIG. 1a. It is also not necessary for the channel 1 to be present. Any geometric structure can be chosen, depending on the desired output signal. In a manner analogous to that in the case of conventional pressure wave microphones, use can be made of geometric obstructions in order to obtain the desired relationship, which is dependent on the application, between the flow wave signal and the electrical signal.

During use, the heating element H is heated by means of an external energy source (not shown in FIG. 1a). The temperatures of the two sensors S1, S2 are measured individually.

Figure 1B:
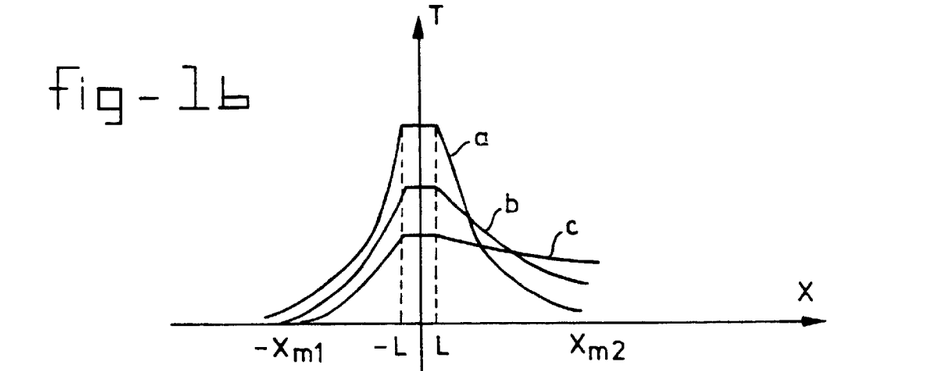
FIG. 1b shows temperature profiles arising in the microphone according to FIG. 1a as a function of the distance x.

FIG. 1b shows the change in the temperature in the channel 1 as a function of the distance x from the center of the heating element H. The temperature T is constant over the entire heating element H and is therefore constant between the positions x=−L and x=L. Curve a in FIG. 1b shows the change in the temperature T as a function of the distance x for the situation where there is no fluid flow 2 through the channel 1. In that case, the pattern of the change in the temperature T in the channel 1 is symmetrical about the mid-point of the heating element H.

As is known, heat transport from the heating element H to the surroundings thereof takes place via convection, radiation and/or conduction. In the situation associated with curve a in FIG. 1b, the convection is zero because the fluid flow 2 is absent.

Curves b and c in FIG. 1b show various changes in temperature T as a function of the distance x for various flow rates of the fluid flow 2. For both curves b and c, the fluid flow 2 is directed towards the right in FIG. 1a. Consequently, the temperature at the sensor S1 is lower than that at the sensor S2 because the heat transport as a result of convection takes place only towards the right.

Figure 1C:
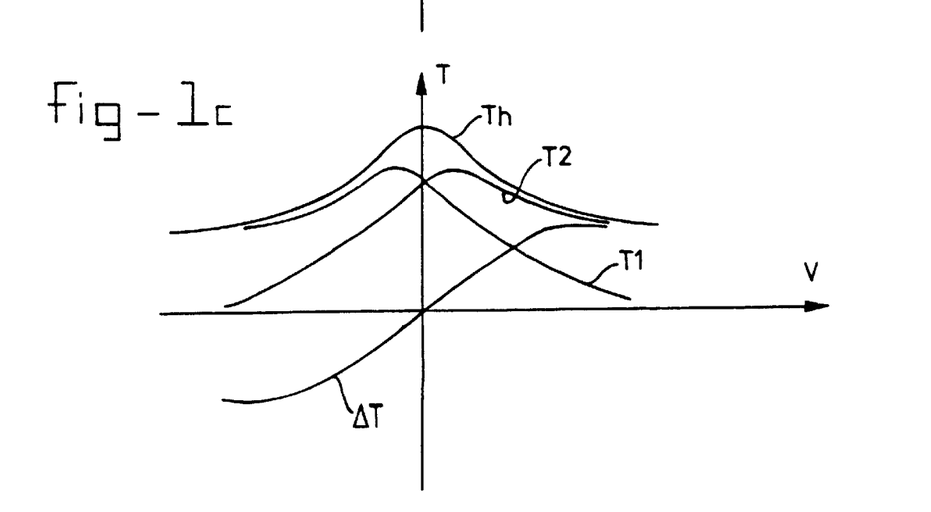
FIG. 1c shows profiles of the temperature of several components of the microphone according to FIG. 1a as a function of the velocity v of the fluid.

FIG. 1c shows the temperature of the heating element H, of the sensor S1 and of the sensor S2 as a function of the velocity v of the fluid flow 2. For FIG. 1c as well, a positive velocity v corresponds to a fluid flow 2 directed towards the right in FIG. 1a. In FIG. 1c, Th indicates the temperature of the heating element H, T1 the temperature of the sensor S1, T2 the temperature of the sensor S2 and ΔT the difference between the temperatures of the sensors S2 and S1; consequently ΔT=T2−T1.

For a symmetrical arrangement of the sensors S1 and S2 around the heating element H, the curve drawn for Th (v) is symmetrical about the T axis and ΔT (v) is symmetrical about the origin. It follows from FIG. 1c that the velocity v of the fluid flow 2 can be unambiguously determined by measuring the temperatures of the sensors S1 and S2. The precise shape of the curves in FIG. 1c depends on the heat generated by the heating element H, as well as on the heat transport as a consequence of conduction and radiation, and calibration will therefore be needed.

Figure 2A:
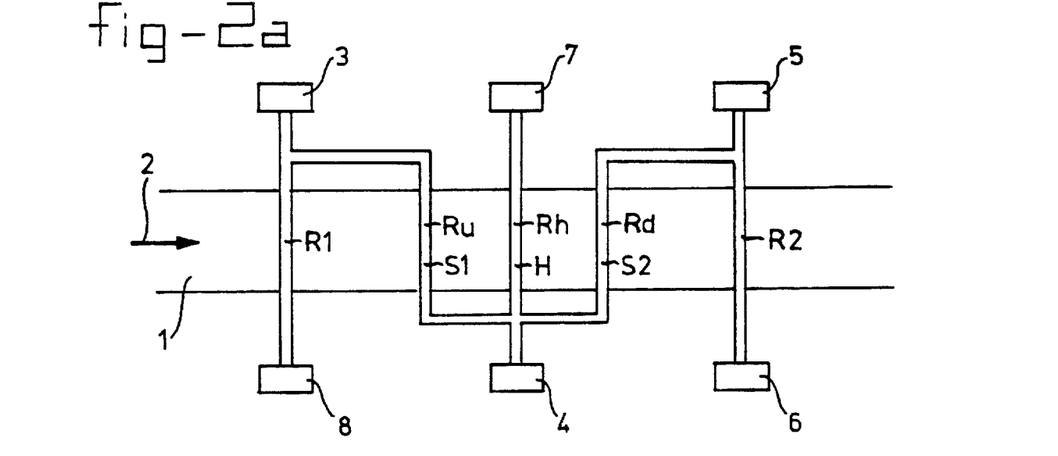

It is observed that in the arrangement according to FIG. 2a, also sensors S1 and S2 may be heated. Of course, in that case other temperature profiles than shown in FIGS. 1b and 1c will arise but these other temperature profiles will still unambiguously define the fluid flow 2 in channel 1.

Figure 1D:
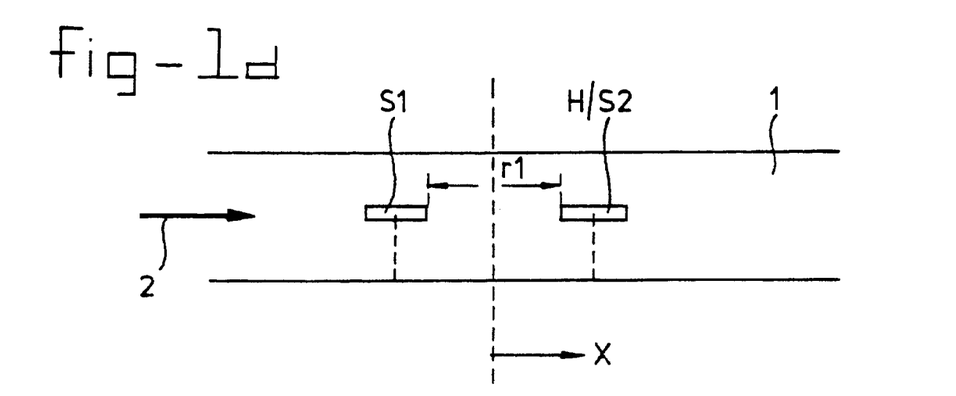
FIG. 1d shows a further embodiment of a microphone according to the invention.

FIG. 1d shows an alternative embodiment of the microphone according to the invention. Instead of the application of one heating element H accompanied by two sensors S1 and S2 as shown in FIG. 1a, the microphone may also be based on the application of two sensors S1 and S2 only, albeit that, then, at least one of the sensors S1, S2 need be heated relative to the temperature of the fluid flow 2.

Figure 1E:
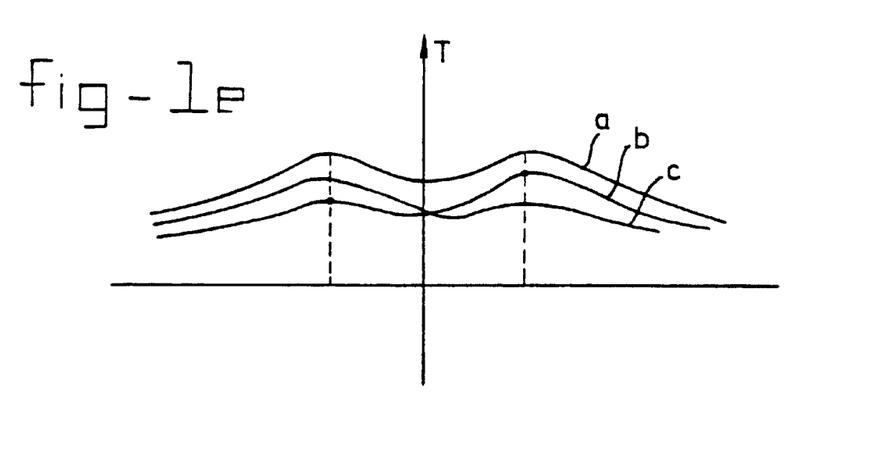
FIG. 1e shows some temperature profiles arising in the microphone according to FIG. 1d for different fluid flows.

FIG. 1e shows three temperature profiles which may occur in the arrangement according to FIG. 1d. Curve a in FIG. 1e represents an equilibrium state in which no fluid flow is present. For curve a it is assumed that both sensor S1 and sensor S2 are heated to the same extent, however, that is not strictly necessary. Even when the sensors S1 and S2 are differently heated an unambiguously defined curve exists to which the microphone can be calibrated. Curve b represents a state when fluid flow 2 is directed to the right, i.e., from sensor S1 towards sensor S2. Then, sensor S1 is more cooled by fluid flow 2 than sensor S2 since the fluid flow transports heat from sensor S1 to sensor S2. Curve c represents the state in which fluid flow 2 is directed in the opposite direction, i.e., from sensor S2 to sensor S1. The arrangement according to FIG. 1d is expected to have better high frequency performance in the audible range than the arrangement according to FIG. 1a. However, the arrangement according to FIG. 1a is the most sensitive one since two sensors are used.

In the arrangement according to FIG. 1d, heating of either sensor S1 or sensor S2 may be omitted. The arrangement operates also properly when only one of the sensors S1 or S2 is heated and the other one is used as a non-heated sensor. In such a latter arrangement, the heated element need not even be used as sensor, i.e., it may be sufficient to detect the (varying) output signal of one of the elements S1 or S2 only and use the other element only as a heater. This situation is indicated by "H/S2" in FIG. 1d, meaning that the most right element may be either sensor S2, heating element H, or both.

FIG. 2a shows a top view of a practical embodiment of the fluid flow arrangement according to FIG. 1a. Further data on this sensor are given, for example, in T. S. J. Lammerink, et al. Micro-liquid flow sensor, Sensors and Actuators A, 37–38 (1993) 45–50. The channel 1 can be arranged on a silicon disc 300 $\mu$m thick. The height of the channel 1 (as seen in the side view in FIG. 1a) is, for example, 250 $\mu$m, whilst the width of the channel 1 (as seen in FIG. 2a) is, for example, 1000 $\mu$m. The heating element H and the two sensors S1 and S2 preferably consist of thin SiN strips having a thickness of, for example, 1 $\mu$m, on top of which a metal layer has been vapour-deposited. Said metal layer can, for example, comprise a layer of CrAu having a thickness of 200 nanometres. However, other materials are possible, for instance a pn junction. A plurality of metal layers lying on top of one another are also possible. The heating element H and the two sensors S1 and S2 thus comprise strips of a predetermined resistance value floating freely in the channel 1. Said resistance values are shown in FIG. 2a by the letters Rh, Ru and Rd for the resistance element H, the temperature sensor S1 and the temperature sensor S2, respectively. The resistance strips R1 and R2 are arranged in order to form an electronic measuring bridge, as will be explained with reference to FIG. 2b.

Each of the resistances Rh, Ru, Rd, R1 and R2 can be connected to external means with the aid of conductive connection pads 3–8 of suitably chosen dimensions.

By connecting the heating element H to a predetermined heating voltage or supplying it with a predetermined heating current, said element will generate heat. The resistance values Ru and Rd of the sensors S1 and S2, respectively, depend on the temperatures of said sensors, so that measurement of the resistances Ru and Rd is a direct measure for the temperature of the sensors S1 and S2.

Figure 2B:
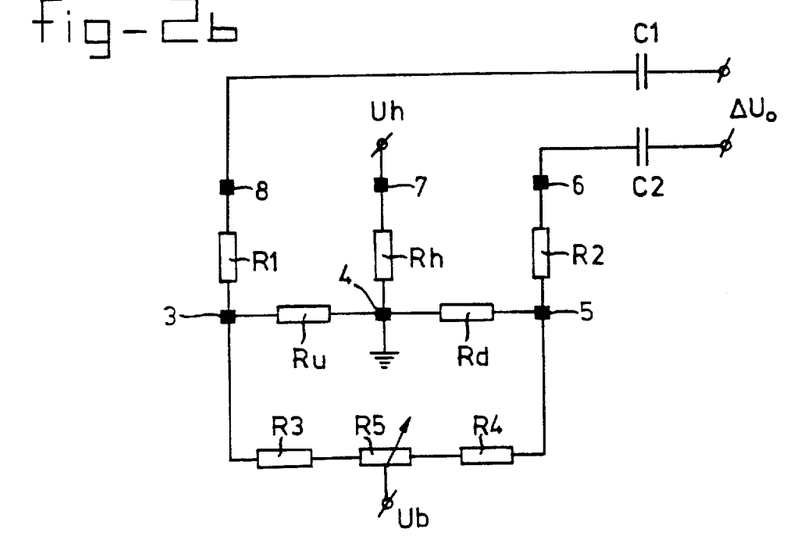

FIG. 2b shows a diagram of an electrical circuit for connection of the fluid flow sensor according to FIG. 2a in such a way that an output voltage $\Delta$Uo can be generated, which output voltage is a direct measure for an acoustic signal which is fed over the fluid flow sensor according to FIG. 2a. Therefore, FIG. 2b shows an electric circuit which is suitable, when connected to the device according to FIG. 2a, to provide a microphone. In the circuit according to FIG. 2b, the connection pad 7 is connected to a heating voltage Uh, whilst the connection pad 4 is connected to earth. The resistance Ru is located between the connection pads 3 and 4, whilst the resistance Rd is located between the connection pads 5 and 4. A series circuit comprising resistors R3, R5 and R4 is arranged between the connection pads 3 and 5. Resistor R5 is a variable resistor which has a junction to which a setting voltage Ub for the measuring bridge consisting of the resistances Ru, Rd, R3, R5 and R4 can be connected. Connection pad 8 is connected to a capacitor C1 and connection pad 6 is connected to a capacitor C2. During operation an output voltage $\Delta$Uo, which depends on the resistance values Ru and Rd of the sensors S1 and S2 respectively, is produced at the output of the circuit according to FIG. 2b. Said output voltage $\Delta$Uo is a function of the resistance variations of the resistances Ru and Rd and thus of the temperature difference variations of the sensors S1 and S2. As a result of the use of the capacitors C1 and C2, the circuit according to FIG. 2b is suitable only for measurement of voltage variations and not of continuous voltage differences over the sensors S1 and S2. In other words, the circuit according to FIG. 2b is suitable for measuring the variations in the magnitude of the fluid flow 2 through the channel 1. Of course, instead of capacitors C1 and C2 any other suitable high pass filter can be used.

With the device in FIG. 2a, the variations in the magnitude of the fluid flow are first translated into temperature difference variations of the sensors S1 and S2. Because of this translation step, the speed of change in flow can be measured properly only if the open spacings r1, r2 between the sensors S1, S2 and the heating element H are not too great. If the chosen spacings r1, r2 are too great, high frequency variations in the fluid flow 2 will hardly result in detectable temperature difference variations at the sensors S1 and S2. Conversely, however, if the chosen spacings are very small, variations in the magnitude of the fluid flow 2 will result in readily detectable variations in the temperatures of the sensors S1 and S2.

In order now to make the device shown in FIG. 2a suitable as a microphone for frequencies within the audible range, it must be possible readily to detect variations in the magnitude of the fluid flow 2 with frequencies in the audible range. In a microphone which has been produced in practice, the open spacings r1, r2 between the sensors S1 and S2 and the heating element H, respectively, were 40 $\mu$m. To be applicable as a microphone for the audio range, the open spacings are preferably less than 300 $\mu$m. Using the electrical circuit according to FIG. 2b, it was possible to detect acoustic waves up to very high frequencies with this microphone: up to at least 10 kHz, good signal to noise ratios were found.

An additional advantage of the microphone based on the fluid flow sensor according to FIG. 2a is that low frequencies of acoustic waves can also be measured unattenuated with this microphone. A conventional pressure microphone responds hardly at all to low frequencies of acoustic waves and therefore also reproduces these only with attenuation.

Figure 3:
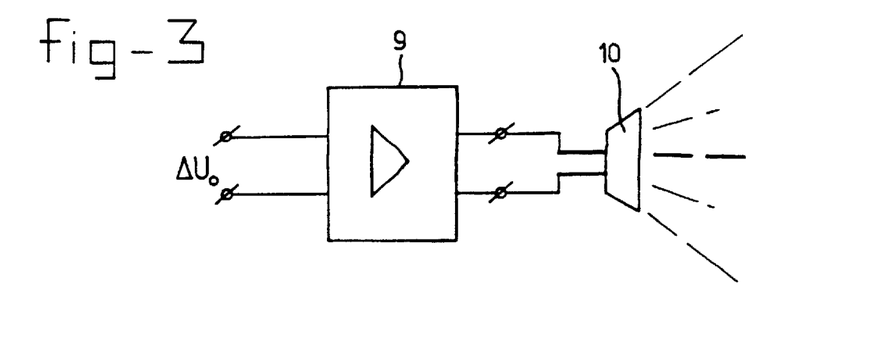
FIG. 3 shows a diagrammatic representation of a circuit for generation of an acoustic wave.

FIG. 3 shows, diagrammatically, an amplifier 9 and a loud-speaker 10 connected thereto, with which the output signal $\Delta$Uo can be converted into an amplified acoustic signal. Since a microphone based on fluid flow measurements shows a 1/f characteristic (f being the frequency of the audio wave) the amplifier 9, preferably, has a linear f characteristic, or, in other words, shows a first order behaviour.

The nominal values for the resistances shown in FIG. 2b are, for example, as follows: Rh=800 $\Omega$, Ru=Rd=3300 $\Omega$, R1=R2 =725 $\Omega$, R3=R4=3300 $\Omega$ and R5=100 $\Omega$. Other values of Rh, Ru, and Rd are possible. Preferably, the resistance values of Rh, Ru, and Rd are within the range of 20–5000 $\Omega$.

It will be clear to a person skilled in the art that FIG. 2b is merely one illustrative embodiment of an electric circuit with which variations in the temperature of the sensors S1 and S2 can be measured electrically. Other electric circuits are possible, as will be illustrated below with reference to FIGS. 4a–4d. The only essential feature is that the temperature difference variations of the sensors S1 and S2 are converted with the aid of a suitable electric circuit into alternating voltages, the frequencies of which correspond to the frequencies in the temperature changes of the temperatures T1 and T2 of the sensors S1 and S2, respectively. In the arrangement according to FIG. 2a, the resistances R1 and R2, which form part of the bridge arrangement according to FIG. 2b, are also integrated in the microphone. However, this does not have to be the case. They can even be entirely omitted, i.e., R1=R2 a 0Ω. On the other hand, it is also possible to integrate the resistors R3, R5 and R4 (FIG. 2b) as well. Of course, said resistances R1 to R5 must be arranged at a distance from the heating element H such that this has no influence on their resistance value.

FIGS. 4a–4d show some alternative electrical circuits for converting the resistance variations of resistors Ru and Rd into a varying electrical signal, i.e., either a varying current or a varying voltage.

Each of the alternative electrical circuits of FIGS. 4a–4d are based on the application of a Widlar current mirror or "gadget", in which resistor Ru is connected as an emitter resistor to a transistor T1, the base of which being short-circuited to its collector, and resistor Rd is connected as an emitter resistor to a transistor T2. The bases of transistors T1 and T2 are connected to one another.

Figure 4A:
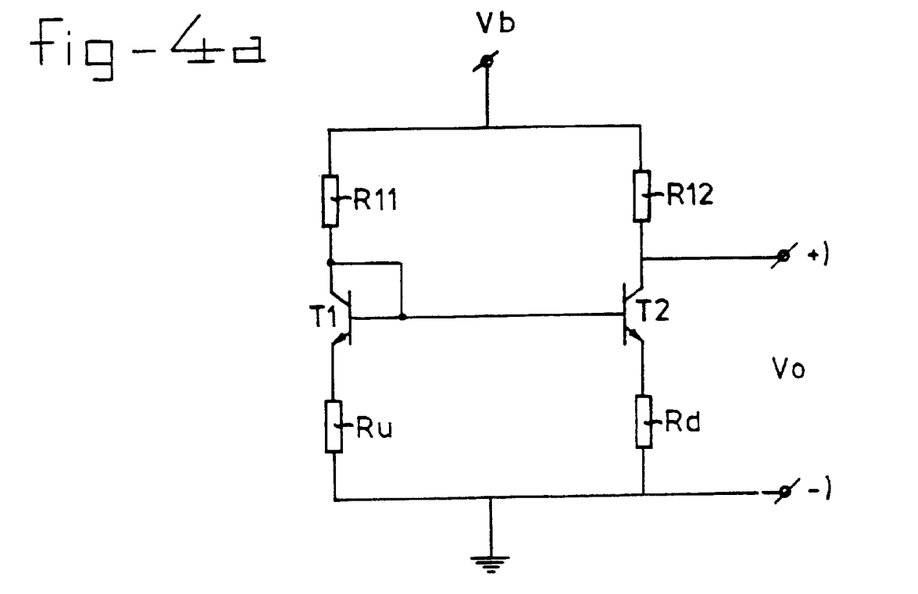
FIGS. 4a–4d show several alternative electrical circuits for converting acoustic waves into an electrical signal by means of the microphone according to the invention.
Figure 4B:
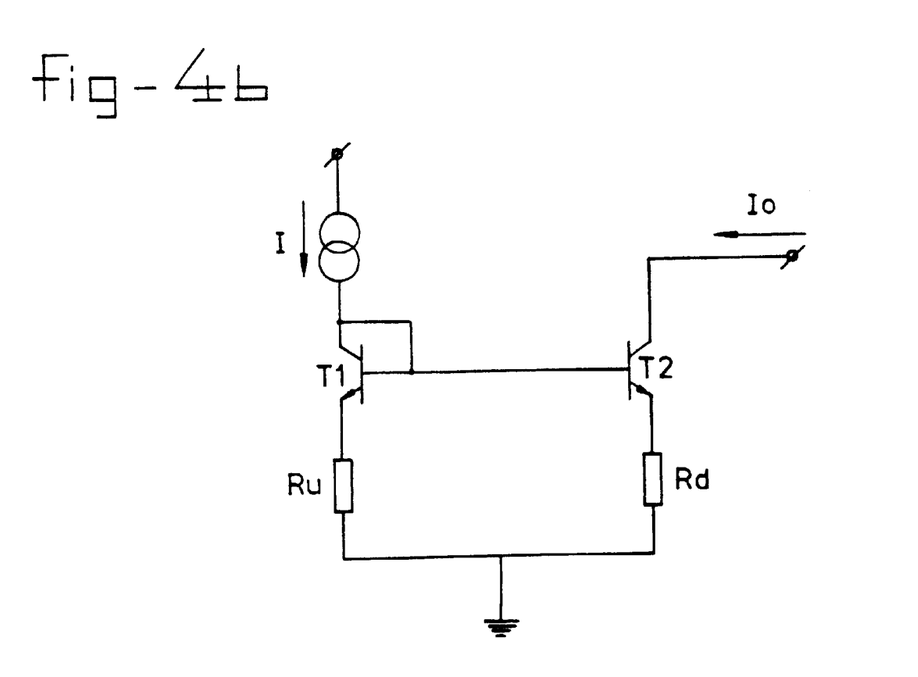

The collector of transistor T1 may be connected to a power supply voltage Vb through a resistor R11, as shown in FIG. 4a, or to a current source I, as shown in FIG. 4b. In the embodiment of FIG. 4a, the collector of transistor T2 is connected to the power supply voltage Vb through a resistor R12. An output voltage Vo is available between the collector of the transistor T2 and ground, as shown in FIG. 4a.

In the arrangement according to FIG. 4b, the output signal is the collector current Io of transistor T2. However, Io in the arrangement of FIG. 4b may be transferred in an output voltage by connecting a resistor to the collector of transistor T2.

Figure 4C:
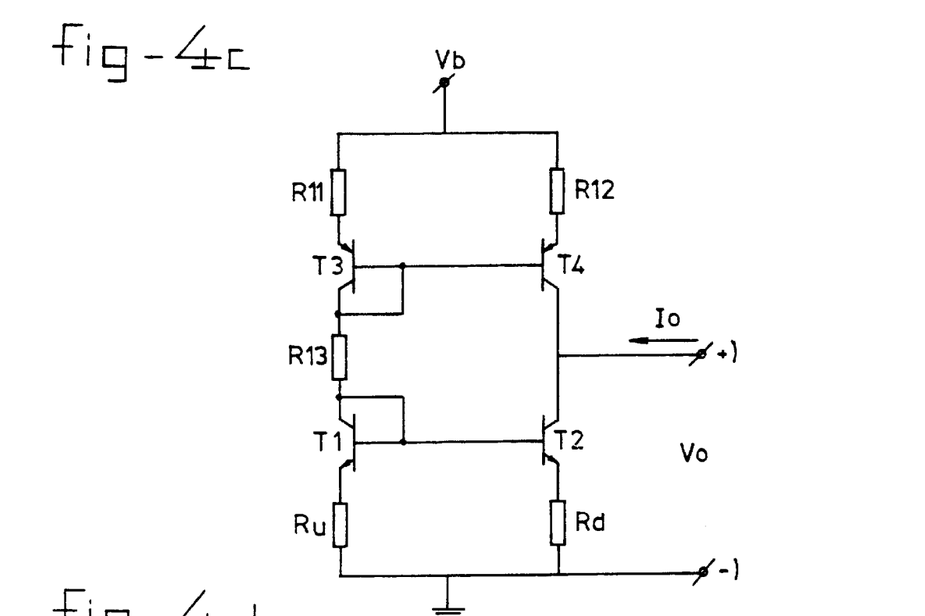

FIG. 4c shows a further alternative electrical circuit, in which, however, the basic arrangement of transistors T1, T2 and of resistors Ru, Rd is unchanged. The collector of transistor T1 is connected to the collector of a pnp transistor T3 through a resistor R13. Transistor T3 is connected in a Widlar current mirror configuration with a pnp transistor T4 and with emitter resistors R11 and R12 as shown in FIG. 4c. The collector of transistor T4 is connected to the collector of transistor T2. Resistors R11, R12 may be sensors of a further microphone based on fluid flow measurements, like resistors Ru, Rd. Alternatively, either resistors Ru and R12 or Rd and R11 in combination may be part of microphones based on fluid flow measurements. Likewise, any of the resistors Ru, Rd, R11, or R12 may be part of a microphone with just one heating element and one sensor (see FIG. 1d).

Figure 4D:
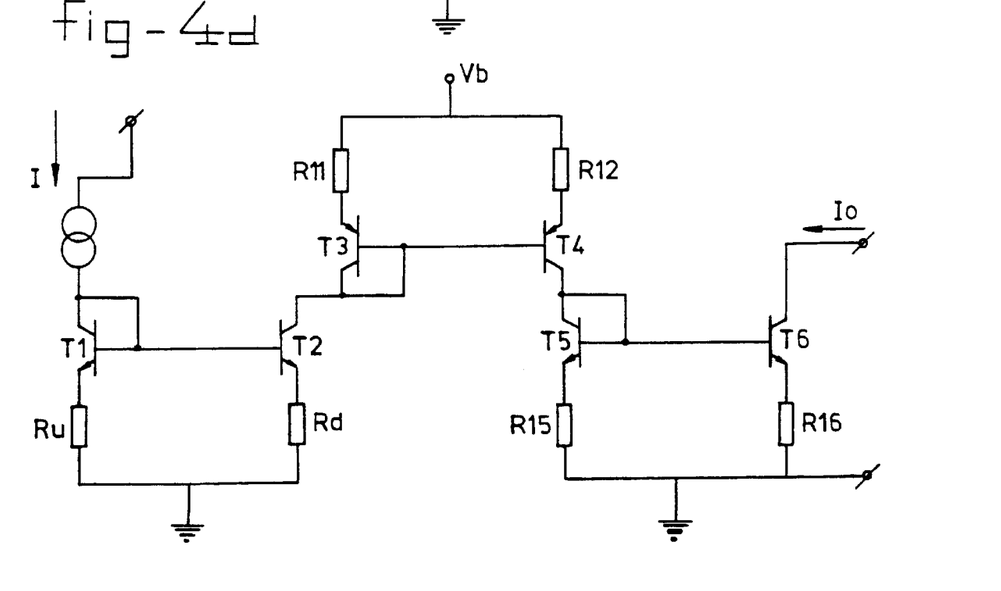

FIG. 4d shows a circuit for converting resistance variations of resistors Rd and Ru into a varying electrical signal, in which three cascaded Widlar current mirrors are used. The first current mirror is equal to the current mirror arrangement of FIG. 4b, the output of which is connected to an input of a pnp Widlar current mirror of transistors T3, T4 and emitter resistors R11, R12. The output of the latter pnp Widlar current mirror is connected to an input of an npn Widlar current mirror comprising transistors T5, T6 and emitter resistors R15, R16. The collector current of transistor T6 provides the output current Io of the circuit. The output current Io can be converted into an output voltage by connecting a resistor to the collector of transistor T6, like the resistor R12 in FIG. 4a. Like in the arrangement according to FIG. 4c, resistors R11, R12, R15, R16 can, either alone or in combination with another one, be part of a microphone based on fluid flow measurements.

The advantage of the arrangements according to FIGS. 4a–4d is that they are easier to operate and have more tolerances than the Wheatstone bridge configuration of FIG. 2b.

It is to be noted that the circuits of FIGS. 4a–4d are shown to include bipolar transistors, however, MOSFET's or JFET's may be used instead. For more details regarding the electrical circuit according to FIGS. 4a–4d, the reader is referred to H. E. de Bree, et al., The µ-Flown, a novel device measuring acoustical flows", to be presented at the conference Transducers '95, Stockholm, Jun. 26, 1995; H. E. de Bree, "The Wheatstone Gadget, a simple circuit for measuring differential resistance variations", to be published.

It is observed that the electrical measuring circuits of FIGS. 4a–4d for measuring differential resistance values between two (or more) variable resistors Ru, Rd may also be used in other configurations, i.e. configurations in which resistors Ru, Rd are no part of a microphone based on fluid flow measurements.

Because of the small dimensions and its low frequency sensitivity the microphone described above offers many interesting applications, some of which will be listed below.

1. For measuring turbulence the application of small microphones sensitive to very low frequencies is required. The microphone according to the invention meets these requirements.

2. The microphone according to the invention may be applied in the field of acoustic imaging (acoustic holography). Acoustic imaging is a method to measure acoustic fields by means of an array of microphones (for example in 128×128 positions). At the moment, such a method can be carried out by means of pressure microphones. However, such pressure microphones are expensive and, moreover, pressure microphones affect the acoustic field principally. The microphone described here is expected to cost only a fraction of the costs of pressure microphones. Moreover, since the microphone according to the invention is based on measuring fluid flows it hardly affects the acoustic field to be measured.

3. The microphone according to the invention may be used in the field of hydrophony which is, e.g., used to minimize the noise generation of ships. For this purpose, microphones are required which are not degraded by water and which show a frequency range of up to 5 kHz. By the application of a gel, known to a person skilled in the art per se, having the same acoustic impedance as water, the microphone according to the invention may be constructed insensitive to water.

4. The microphone according to the invention can advantageously be applied in airplanes. To measure acoustic waves in airplanes, at the moment, both pressure waves and flow waves are measured. At the moment, the flow wave is deducted from the pressure wave at different locations. However, at low frequencies (i.e. about 100 Hz) this method leads to errors due to phase shift problems. The solution of this problem is to measure the volume flow at one location which can be carried out very easy with the microphone described here. The microphone is very sensitive about 100 Hz and the seize of the microphone is such that the volume flow can be measured at one location.

5. The microphone according to the invention may be used to evaluate standing waves in a tube. In such an analysis the reflection coefficient of materials is measured by means of a standing wave tube. However, this is a complicated method, which could be simplified by means of a combination of a pressure microphone and a microphone based on fluid flow measurement.

6. The microphone according to the present invention can be used as a uni-polar microphone for carrying out stereo-measurements in a single point. Such a microphone could advantageously be used in "open line telephones". Such telephones are used in the field of valuta and stocks. These are a kind of hands-free telephones, i.e. telephones without a receiver but including a microphone and a large loudspeaker arranged in a room, however, with the feature that the loudspeaker signal is never suppressed. In a hands-free telephone, as soon as somebody speaks into the microphone, the loudspeaker signal is suppressed to avoid acoustic feedback. By using a unipolar microphone much an acoustic feedback can be avoided. Such a unipolar may be realized by combining a pressure microphone and a microphone based on fluid flow measurement and by adding the output signals of both.

7. The microphone according to the invention may be used for transonic measurements. The generation of noise by propellers and turbofan motors is examined in a wind tunnel with wind speeds about the speed of sound. During such an examination it is very important that the air flow is not disturbed. Acoustic pressures are in the order of 140 dBSPL and the frequencies observed are below 2 kHz. Therefore, the microphone described here is very suitable to be used in such an arrangement. The microphone according to the invention is small and, moreover, the acoustic pressures are very high, while the frequencies are relatively low. Principally, the measurements can be carried out with the one-sensor-one-heater configuration.

8. The microphone according to the invention can be used to measure the acoustic radiation of an airplane body. To carry out a measurement as accurate as possible the measurement need be carried out as close to the body as possible. The intensity sensors according to the prior art are too large to do so. However, a combination of a microphone based on fluid flow measurements and a pressure microphone are able to carry out such measurements.

9. An acoustic wave is entirely determined by a pressure wave and a flow wave. By a combination of a pressure microphone and a microphone based on fluid flow measurements, therefore, an acoustic wave can be measured accurately. Therefore, such a combination offers a better possibility than a pressure microphone only in anti-noise systems for measuring acoustic waves as accurate as possible.

10. The direction of an acoustic wave can be measured by means of, e.g., three perpendicular microphones based on fluid flow measurements and a pressure microphone. Preferably, in such an arrangement the microphones based on fluid flow measurement have to be constructed to be sensitive in one direction only.

We claim:
1. A fluid flow measuring device as a microphone for detecting acoustic waves, said fluid flow measuring device comprising at least one heating element (H), at least a first temperature sensor (S1) arranged at a first predetermined spacing (r1) from the heating element (H), for generation of a first electrical signal which corresponds to the temperature (T1) of the first temperature sensor (S1) wherein the predetermined first spacing (r1) is less than 300 $\mu$m.

2. The device according to claim 1, wherein the heating element (H) and the first temperature sensor (S1), respectively, are formed by a heating resistance strip (Rh) and a first (Ru) sensor resistance strip (Ru), respectively, which strips are arranged some distance apart in a channel (1) along which the acoustic wave is able to propagate, the channel (1) having a predetermined height and width.

3. The device according to claim 1, wherein the predetermined first spacing (r1) is less than 50 $\mu$m.

4. The device according to claim 1, wherein the temperature sensor (S1) is also heated during operation.

5. The device according to claim 1, wherein the heating element (H) is arranged as a second temperature sensor (S2) for generation of a second electrical signal which corresponds to the temperature (T2) of the second temperature sensor (S2).

6. The device according to claim 1, wherein a second temperature sensor (S2) is provided arranged at a second predetermined spacing (r2) from the heating element (H), for generation of a second electrical signal which corresponds to the temperature (T2) of the second temperature sensor (S2), the predetermined second spacing (r2) being less than 300 $\mu$m.

7. The device according to claim 6, wherein the first predetermined spacing (r1) is equal to the second predetermined spacing (r2).

8. The device according to claim 1, comprising an electronic measuring circuit for measuring said first electrical signal and providing an electrical output signal ($\Delta$Uo; Vo; Io).

9. The device according to claim 1, comprising an electronic measuring circuit for measuring said first electrical signal and said second electrical signal and for providing an electrical output signal ($\Delta$Uo; Vo; Io).

10. The device according to claim 9, wherein the electronic measuring circuit comprises a bridge circuit and a high pass filter (C1, C2) connected to said bridge circuit, the latter being connected to a setting voltage (Ub), the first sensor (S1) being a first temperature dependent resistor (Ru) and the second sensor (S2) being a second temperature dependent resistor (Rd), said first and second temperature dependent resistors (Ru, Rd) being located in different branches of the bridge.

11. In combination, a first microphone comprising a pressure measuring device and second microphone comprising a fluid flow measuring device for detecting acoustic waves, said fluid flow measuring device comprising at least one heating element (H), at least a first temperature sensor (S1) arranged at a first predetermined spacing (r1) from the heating element (H), for generation of a first electrical signal which corresponds to the temperature (T1) of the first temperature sensor (S1), wherein the predetermined first spacing (r1) is less than 300 $\mu$m.

12. System comprising a microphone comprising a fluid flow measuring device for detecting acoustic waves, said fluid flow measuring device comprising at least one heating element (H), at least a first temperature sensor (S1) arranged at a first predetermined spacing (r1) from the heating element (H), for generation of a first electrical signal which corresponds to the temperature (T1) of the first temperature sensor (S1) wherein the predetermined first spacing (r1) is less than 300 $\mu$m, the microphone also comprising an electronic measuring circuit for measuring said first electrical signal and providing an electrical output signal ($\Delta$Uo; Vo; Io), the (system further comprising an amplifier (9) for amplifying said output signal and providing an amplified output signal, and a loudspeaker (10) connected to said amplifier (9).

13. The system according to claim 12, wherein the heating element (H) and the first temperature sensor (S1), respectively, are formed by a heating resistance strip (Rh) and a first (Ru) sensor resistance strip (Ru), respectively, which strips are arranged some distance apart in a channel (1) along which the acoustic wave is able to propagate, the channel (1) having a predetermined height and width.

14. The system according to claim 12, wherein the predetermined first spacing (r1) is less than 50 μm.

15. The system according to claim 12, wherein the temperature sensor (S1) is also heated during operation.

16. The system according to claim 12, wherein the heating element (H) is a second temperature sensor (S2) for generation of a second electrical signal which corresponds to the temperature (T2) of the second temperature sensor (S2) and wherein said electronic measuring circuit is also for measuring said second electrical signal.

17. The system according to claim 12, wherein a second temperature sensor (S2) is at a second predetermined spacing (r2) from the heating element (H), for generation of a second electrical signal which corresponds to the temperature (T2) of the second temperature sensor (S2), the predetermined second spacing being less than 300 μm and wherein said electronic measuring circuit is also for measuring said second electrical signal.

18. The system according to claim 17, wherein the first predetermined spacing (r1) is equal to the second predetermined spacing (r2).

19. The system according to claim 12, wherein the electronic measuring circuit comprises a bridge circuit and a high pass filter (C1, C2) connected to said bridge circuit, the latter being connected to a setting voltage (Ub), the first sensor (S1) being a first temperature dependent resistor (Ru) and the second sensor (S2) being a second temperature dependent resistor (Rd), said first and second temperature dependent resistors (Ru, Rd) being located in different branches of the bridge.

20. The system according to claim 12, wherein the electronic measuring circuit comprises a current mirror comprising at least a first transistor (T1) and a second transistor (T2) coupled in a current mirror configuration, the first sensor (S1) being a first temperature dependent resistor (Ru) and the second sensor (S2) being a second temperature dependent resistor (Rd), said first temperature dependent resistor (Ru) and said second temperature dependent resistor (Rd), respectively, being connected as emitter resistors to the first (T1) and second (T2) transistors, respectively.

* * * * *